United States Patent [19]

Vijayendran et al.

[11] Patent Number: 5,173,526

[45] Date of Patent: Dec. 22, 1992

[54] AQUEOUS POLYURETHANE-VINYL POLYMER DISPERSIONS FOR COATING APPLICATIONS

[75] Inventors: Bheema R. Vijayendran, Emmaus; Richard Derby, Allentown; Bruce A. Gruber, Emmaus, all of Pa.

[73] Assignee: Air Products and Chemicals, Inc., Allentown, Pa.

[21] Appl. No.: 691,766

[22] Filed: Apr. 26, 1991

[51] Int. Cl.$^5$ .............................. C08J 3/02; C08F 2/00
[52] U.S. Cl. ..................................... 524/457; 526/217
[58] Field of Search .......................................... 524/457

[56] References Cited

U.S. PATENT DOCUMENTS

| | | | |
|---|---|---|---|
| 3,684,758 | 8/1972 | Honig et al. | 260/29.6 |
| 3,705,164 | 12/1972 | Honig et al. | 260/29.6 |
| 4,198,330 | 4/1980 | Kaizerman et al. | 260/29.6 |
| 4,318,833 | 3/1982 | Guagliardo | 524/457 |
| 4,644,030 | 2/1987 | Loewrigkeit et al. | 524/457 |

FOREIGN PATENT DOCUMENTS 0308115 3/1989 European Pat. Off. .

Primary Examiner—Joseph L. Schofer
Assistant Examiner—Wu C. Cheng
Attorney, Agent, or Firm—Michael Leach; James C. Simmons; William F. Marsh

[57] ABSTRACT

A method for making an aqueous polyurethane-vinyl polymer dispersion which comprises:

(a) forming a carboxy-containing, water-dispersible, isocyanate terminated polyurethane prepolymer, (b) adding a vinyl monomer composition which includes a polyethylenically unsaturated monomer to the prepolymer to form a prepolymer/monomer mixture, (c) adding a tertiary amine to the prepolymer/monomer mixture, (d) dispersing the prepolymer/monomer mixture in water, (e) adding an oil soluble free radical initiator and a chain-extender to the aqueous dispersion, and (f) polymerizing the vinyl monomer and completing chain extension of the prepolymer by heating the aqueous dispersion.

24 Claims, No Drawings

AQUEOUS POLYURETHANE-VINYL POLYMER DISPERSIONS FOR COATING APPLICATIONS

FIELD OF THE INVENTION

The present invention relates to aqueous polymer dispersions comprising polyurethane and vinyl polymer components.

BACKGROUND OF THE INVENTION

Converters of paper products such as book covers, magazine covers, and labels apply to their finished product a protective coating for resistance to scuff, abrasion, alcohol, soap, oils and the like.

In the past, these protective coatings have been primarily solvent based using alkyd, polystyrene and nitrocellulose polymers. Other coatings have utilized UV cured epoxy acrylates or laminates of polyethylene. Problems that are encountered with these coatings are their expense, the need for special equipment such as UV lamps, and organic solvents that need to be collected as the coatings dry. In addition, some of the coatings need to be applied off-press with a roll coater and dried in long ovens. On converter equipment where water-based inks are used, a water-based coating product that can be applied on-press with no or minimal equipment change is desirable.

Some products are available that solve some of the problems, but no product is available that has a broad range of properties to solve most of the problems. For example, acrylic dispersions supply some solvent resistance, but are poor against alkali and abrasion. UV coatings can be applied on-press and provide good protection, but they are expensive and contain monomers that are irritants or sensitizers.

There is a need for a water-based coating that can be applied by conventional flexographic or gravure methods, preferably on existing equipment, and provides a good balance of protection from solvents, corrodants, abrasion and good gloss and flexibility at a competitive price.

U.S. Pat. No. 3,684,758 and 3,705,164 disclose a process for making stable aqueous polymer dispersions by subjecting vinyl monomers to radical emulsion polymerization in the presence of a stable aqueous dispersion of (a) a high molecular weight cationic polyurethane which is gel-like in character and (b) a high molecular weight polyurethane containing anionic groups, respectively. The '164 patent in Examples 9 and 10 shows the use of a monomer mixture containing a difunctional monomer, namely butadiene and butane diol dimethacrylate, respectively.

U.S. Pat. No. 4,198,330 discloses a polyurethane latex and a polymer of at least one vinyl monomer, the polymer having been obtained by free radical polymerization of the monomer in the presence of the latex and being characterized as a hard, resinous material at temperatures below about 60° C. Example III shows the use of azobisisobutyronitrile (AIBN) for initiating the polymerization of the monomers.

U.S. Pat. No. 4,644,030 discloses a method for making a stable aqueous dispersion of polymeric material comprising:
(A) producing an NCO-terminated polyurethane prepolymer in the presence of inert liquid polymerizable ethylenically unsaturated monomer material,
(B) dispersing the product from (A) in water,
(C) chain-extending the prepolymer in the resulting aqueous dispersion, and
(D) subjecting the aqueous dispersion from (C) to vinyl addition polymerization conditions to polymerize the monomer material in-situ, the weight ratio of chain extended polyurethane to monomer material being about 9:1 to about 1:9. Also disclosed in U.S. '030 are the resulting aqueous dispersions and their use for making films, sheets and other products. Example VII shows the use of the difunctional hexanediol diacrylate in the monomer material.

EP Application 0 308 115 A2 discloses a surfactant-free aqueous polymer dispersion containing an anionic water-dispersible polyurethane and a vinyl polymer in a weight ratio of from 10:90 to 90:10, the dispersion having been obtained by:
(A) forming a solution of an anionic water-dispersible isocyanate-terminated polyurethane in at last one vinyl monomer;
(B) dispering the solution in an aqueous medium;
(C) chain extending the polyurethane, and either
(D) adding further vinyl monomer, and
(E) initiating polymerization of the vinyl monomer, or
(F) initiating polymerization of the vinyl monomer, and
(G) adding further vinyl monomer during polymerization. Example 13 shows a polyurethane-vinyl polymer preparation using AIBN initiator and diallylphthalate as a difunctional monomer.

SUMMARY OF THE INVENTION

The present invention is directed to a method for making an aqueous polyurethane-vinyl polymer dispersion. The aqueous polymer dispersion is prepared by
(a) forming a carboxy-containing, water-dispersible, isocyanate-terminated polyurethane prepolymer,
(b) adding a vinyl monomer mixture which contains a polyethylenically unsaturated monomer to the prepolymer to make a prepolymer/monomer mixture,
(c) adding a tertiary amine to the prepolymer/monomer mixture,
(d) dispersing the prepolymer/monomer mixture in water,
(e) adding an oil-soluble free radical initiator and a chain extender to the aqueous dispersion, and
(f) polymerizing the vinyl monomers and completing the chain extension of the prepolymer by heating the aqueous dispersion.

The aqueous polyurethane-vinyl polymer dispersions can be applied to paper substrate by conventional flexographic or gravure methods and provide a good balance of protection from solvents, corrodants, and abrasion and good gloss and flexibility. Other substrates to which the polyurethanevinyl polymer dispersions can be applied include metals such as steel and aluminum, plastics such as high impact polystyrene, polycarbonate, Mylar polyester and polypropylene, and wood.

DETAILED DESCRIPTION OF THE INVENTION

The isocyanate-terminated polyurethane prepolymers are commonly produced by reacting organic material containing an average of at least about two active hydrogen atoms per molecule, usually a diol and preferably a polyester polyol, with a stoichiometric excess of an organic diisocyanate. Preferably, a suitable proportion of the organic material also contains, as means for providing anionic water dispersibility to the prepolymer, at least one comparatively unreactive pendant carboxylic group which is neutralized with a tertiary amine to salt form after the prepolymer formation and addition of the monomers, but before the formation of the aqueous dispersion.

The polyisocyanates used in making the prepolymer may be an aliphatic, cycloaliphatic, araliphatic or aromatic polyisocyanate. Examples of suitable polyisocyanates include ethylene diisocyanate, 1,6-hexamethylene diisocyanate, isophorone diisocyanate, cyclohexane-1,4-diisocyanate, 4,4'-dicyclohexylmethane diisocyanate, 1,4-phenylene diisocyanate, 2,4-toluene diisocyanate, 2,6-toluene diisocyanate, 4,4'-diphenylmethane diisocyanate, 2,4'-diphenylmethane diisocyanate, polymethylene polyphenyl polyisocyanates and 1,5-naphthylene diisocyanate. Mixtures of polyisocyanates can also be used.

Polymeric polyols having molecular weights in the range of 500–6000 which may be used in the preparation of the prepolymer, particularly include diols and triols and mixtures thereof, but higher functionality polyols may also be used, for example, as minor components in admixture with diols. The polyols may be members of any of the chemical classes of polymeric polyols used or proposed to be used in polyurethane formulations. In particular, the polyols may be polyesters, polyesteramides, polyethers, polythioethers, polycarbonates, polyacetals, polyolefins or polysiloxanes. Preferred polyol molecular weights are from 700–3000.

Polyester polyols which may be used include hydroxyl-terminated reaction products of polyhydric alcohols such as ethylene glycol, propylene glycol, diethylene glycol, neopentyl glycol, 1,4-butanediol, furan dimethanol, cyclohexane dimethanol, glycerol, trimethylolpropane or pentaerythritol, or mixtures thereof, with polycarboxylic acids, especially dicarboxylic acids or their ester-forming derivatives, for example succinic, glutaric and adipic acids or their methyl esters, phthalic anhydride or dimethyl terephthalate. Polyesters obtained by the polymerization of lactones, for example caprolactone, in conjunction with the polyol may also be used. Polyesteramides may be obtained by the inclusion of amino-alcohols such as ethanolamine in the polyesterification mixtures.

Polyether polyols which may be used include products obtained by the polymerization of a cyclic oxide, for example ethylene oxide, propylene oxide or tetrahydrofuran or by the addition of one or more such oxides to polyfunctional initiators, for example water, ethylene glycol, propylene glycol, diethylene glycol, cyclohexane dimethanol, glycerol, trimethylol propane, pentaerythritol or Bisphenol A. Especially useful polyethers include polyoxypropylene diols and triols, poly(oxyethylene-oxypropylene) diols and triols obtained by the simultaneous or sequential addition of ethylene and propylene oxides to appropriate initiators and polytetramethylene ether glycols obtained by the polymerization of tetrahydrofuran.

Polythioether polyols which may be used include products obtained by condensing thiodiglycol, either alone or with other glycols, dicarboxylic acids, formaldehyde, amino-alcohols or amino carboxylic acids.

Polycarbonate polyols which may be used include products obtained by reacting diols such as 1,3-propanediol, 1,4-butanediol, 1,6-hexanediol, diethylene glycol or tetraethylene glycol with diaryl carbonates, for example diphenyl carbonate, or with phosgene.

Polyacetal polyols which may be used include those prepared by reacting glycols such as diethylene glycol, triethylene glycol or hexanediol with formaldehyde. Suitable polyacetals may also be prepared by polymerizing cyclic acetals.

Suitable polyolefin polyols include hydroxy-terminated butadiene homo-and copolymers.

Isocyanate-reactive compounds containing acid groups which may be used in the preparation of the anionic water-dispersible prepolymers include carboxy group containing diols and triols, for example dihydroxyalkanoic acids of the formula

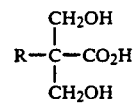

wherein R is hydrogen or a $C_1$–$C_{10}$ alkyl group. The preferred carboxy-containing diol is 2,2-dimethylolpropionic acid. If desired, the carboxy-containing diol or triol may be incorporated into a polyester by reaction with a dicarboxylic acid before being incorporated into the prepolymer. Useful acid group containing compounds include aminocarboxylic acids, for example lysine, cystine and 3,5-diaminobenzoic acid.

The anionic water-dispersible isocyanate-terminated polyurethane prepolymer may be prepared in conventional manner by reacting a stoichiometric excess of the organic polyisocyanate with the polymeric polyol and any other required isocyanate-reactive compounds under substantially anhydrous conditions at a temperature between about 30° and 130° C. until the reaction between the isocyanate groups and the hydroxyl group is substantially complete. A polyisocyanate and the active hydrogen containing components are suitably reacted in such proportions that the ratio of number of isocyanate groups to the number of hydroxyl groups is in the range from about 1.1:1 to about 6:1, preferably within the range of from 1.5:1 to 3:1. If desired, the well-known tin catalysts may be used to assist prepolymer formation.

A mixture of the carboxy-containing water-dispersible polyurethane prepolymer and vinyl monomer is produced by simply adding a vinyl monomer composition to the prepolymer. The vinyl monomer composition must contain a poly-ethylenically unsaturated co-monomer.

Suitable vinyl monomers which may be combined with the prepolymer include ethylenically unsaturated hydrocarbons, esters and ethers, especially esters of acrylic and methacrylic acids, ester of vinyl alcohol and styrene. Specific examples include butadiene, isoprene, styrene, substituted styrenes, the lower alkyl ($C_1$–$C_6$) esters of acrylic, methacrylic and maleic acids, vinyl acetate and butyrate, acrylonitrile, vinylmethyl, propyl and butyl ethers, vinyl chloride, vinylidene chloride, and the like. Suitable polyethylenically unsaturated monomers include butadiene, isoprene, allylmethacrylate, diacrylate esters of $C_2$–$C_6$ diols such as butanediol diacrylate and hexanediol diacrylate, divinyl benzene, divinyl ether, divinyl sulfide, trimethylolpropane triacrylate and the like.

Prior to dispersing the prepolymer/monomer mixture in water, a tertiary amine is added to the mixture in an amount sufficient to render the prepolymer water dispersible, i.e., an amount to substantially neutralize the carboxylic functionality as is well known in the art. Suitably, the amine is added at about 65 to 100% amine equivalent per equivalent of carboxy functionality. It is preferred to add the amine until the dihydroxyalkanoic acid is about 80% neutralized.

Tertiary amines that may be used in the practice of the invention are relatively volatile so that they evaporate from the coating upon curing. Examples would include amines of the formula

where R, $R^1$ and $R^2$ are independently $C_1$–$C_4$ alkyl and hydroxyalkyl groups. Illustrative of such tertiary amines are triethyl amine, dimethylethanol amine, methyldiethanol amine, and methyldiethyl amine.

It is important that the tertiary amine be added to the prepolymer/monomer mixture before the mixture is dispersed in water to ensure compatibility of the organic and aqueous phases in the resulting dispersion. To also enhance the compatibility of the organic and aqueous phases, a small quantity of a polar organic liquid such as N-methylpyrrolidone can be added in amounts ranging from 1 to 12 wt %, preferably 3-6 wt %, of the final polymer dispersion.

The prepolymer/vinyl monomer mixture may be dispersed in water using techniques well known in the art. Preferably, the mixture is added to the water with agitation, or, alternatively, water may be stirred into the mixture.

The active hydrogen-containing chain extender which is reacted with the prepolymer is suitably a polyol, an amino alcohol, ammonia, a primary or a secondary aliphatic, alicyclic, aromatic, araliphatic or heterocyclic amine, especially a diamine.

Examples of suitable chain extenders include ethylenediamine, diethylene triamine, triethylene tetramine, propylene diamine, butylene diamine, hexamethylene diamine, cyclohexylene diamine, piperazine, 2-methyl piperazine, phenylene diamine, toluene diamine, tris(2-aminoethyl)amine, 4,4'-methylenebis(2-chloraniline), 3,3'-dichloro-4,4'-diphenyl diamine, 2,6-diaminopyridine, 4,4'-diaminodiphenyl methane, isopherone diamine, and adducts of diethylenetriamine with acrylate or its hydrolyzed products.

In order to obtain the improved water resistance afforded by the aqueous polymer dispersion, the free radical initiator should be an oil soluble material, meaning a free radical generating material that preferentially partitions into the organic phase compared to the aqueous phase, i.e. not substantially soluble in the aqueous phase. Suitable oil soluble free radical initiators would include the azo-type initiators such as 2,2'-azobis(2,4-dimethylpentanenitrile) and 2,2' azobis(2-methylpropanenitrile) [AIBN]. Redox systems comprising reducing agents and oxidizing agents (free radical initiators) as are well known in the polymerization art can also be used, but the free radical initiator must be oil soluble.

The free radical polymerization of the monomer mixture and the chain extension of the prepolymer is conducted at an elevated temperature, namely a temperature sufficient to liberate free radicals at a rate that sustains the polymerization reaction and to complete chain extending the prepolymer since the chain extending reaction begins to proceed upon the addition of the chain extender to the aqueous dispersion. A suitable temperature range would be 50° to 90° C., preferably 60° to 80° C.

The amount of chain extender employed should be approximately equivalent to the free isocyanate groups in the prepolymer, the ratio of active hydrogens in the chain extender to isocyanate groups in the prepolymer preferably being in the range from 0.7 to 1.3:1. Of course when water is employed as the chain extender, these ratios will not be applicable since the water, functioning as both a chain extender and dispersing medium, will be present in a gross excess relative to the free isocyanate groups.

Polymerization of the vinyl monomers may be effected by one of two methods. In the first method, the monomers are added and may swell the polyurethane prepolymer before the tertiary amine is added. The monomers are then polymerized using the oil soluble free radical initiator. The proportion of monomers used, based on total solids in the resulting dispersion, is suitably from 25 to 75%, preferably from 40 to 60%.

In the second method polymerization of the vinyl monomers involves initially adding a portion of the monomers to the prepolymer, neutralizing with tertiary amine and dispersing the prepolymer/monomer mixture in water followed by polymerization during which additional monomers (the same or different) are added during the polymerization process. Alternatively, the second portion of the monomer composition can be added to the prepolymer/monomer dispersion after amine addition and equilibrated by stirring before the polymerization is begun.

The polymer dispersions obtained can comprise 20 to 60 wt % solids and may be employed as coating compositions and applied to any substrate including wood, metals, glass, cloth, leather, paper, plastics, foam and the like by any conventional method including brushing, dipping, flow coating, spraying and the like. Generally, a coating of the aqueous composition is dried and cured at temperatures ranging from ambient to 150° C. for times ranging from 24 hours to 5 minutes.

EXAMPLE 1

This example shows the preparation of an aqueous polymer dispersion using the ingredients in Table 1.

TABLE 1

| | Parts by Wt |
|---|---|
| 1 Formrez 55-56[a] | 96 |
| 2 Methylene Dicyclohexyl Diisocyanate | 87 |
| 3 10% DABCO T-12[b] | 0.2 |
| 4 N-methylpyrrolidone | 25 |
| 5 Dimethylolpropionic Acid | 14 |
| 6 N-methylpyrrolidone | 27 |
| 7 Butyl Acrylate | 69 |
| 8 Styrene | 129 |
| 9 Hexanediol Diacrylate | 0.9 |
| 10 Triethylamine | 11 |
| 11 Water | 502 |
| 12 Ethylenediamine | 10 |
| 13 N-methylpyrrolidone | 8.4 |
| 14 VAZO 64[c] | 0.9 |
| 15 Water | 20 |

[a]Poly(neopentyl adipate) MW~2000 from Witco Chemical.
[b]Dibutyltin dilaurate from Air Products and Chemicals, Inc.
[c]AIBN from DuPont.

Into a clean, dry reactor equipped with heating, cooling, stirring and a nitrogen blanket capability was charged polyester polyol (1) followed by the aliphatic diisocyanate (2) and the tin catalyst (3). With agitation the reaction mixture was brought to 94° C. and held for 0.5 hours. At this point N-methylpyrrolidone (4) solvent was added followed by titration for %NCO (theoretical NCO equals 11.6%). When the NCO value was met, acid diol (5) powder was added followed by solvent (6) and the reaction maintained at 94° C. for 2.5 hours.

The mixture was cooled to 25° C. while adding butyl acrylate (7), then styrene (8) followed by diacrylate (9). To the prepolymer-monomer solution at 25° C. was added triethylamine (10) with agitation to dissolve.

A second reactor was charged with distilled water (11) under nitrogen blanket and held at 25° C. The VAZO 64 catalyst (14) was dissolved in solvent (13). The water was agitated and the prepolymer-monomer solution was added at a rate of 6.7% of the prepolymer solution per minute. The VAZO 64 catalyst solution was slowly charged and mixed for 5 minutes. Diamine (12) was dissolved in water (15) and added immediately after the initiator. The dispersion was heated to 60° to 65° C., allowed to exotherm to 75° C. and maintained until the monomers were less than 1,000 ppm.

The resulting aqueous polymer dispersion (G) had a solids content of about 40% and a pH of about 8.

EXAMPLE 2

The procedure of Example 1 was followed except that styrene (8) was replaced with an equivalent weight of butyl acrylate yielding aqueous polymer dispersion (B).

EXAMPLE 3

Following the procedure of Example 2 aqueous polymer dispersion (A) was prepared using potassium persulfate as a water soluble initiator in place of VAZO 64 initiator.

EXAMPLE 4

Aqueous polymer dispersion (P) was prepared following the procedure of Example 3 except that styrene (8) and butyl acrylate (7) were replaced with an equivalent weight of ethyl acrylate.

EXAMPLE 5

Aqueous polymer dispersion (H) was prepared following the procedure of Example 1 except that styrene (8) and butyl acrylate (7) were replaced with an equivalent weight of butyl methacrylate.

EXAMPLE 6

Aqueous polymer dispersion (I) was prepared following the procedure of Example 1 except that butyl acrylate (7) was replaced with an equivalent weight of styrene.

EXAMPLE 7

Aqueous polymer dispersion (J) was prepared following the procedure of Example 1 except that styrene (8) and butyl acrylate (7) were replaced with an equivalent weight of methyl methacrylate.

EXAMPLE 8

Aqueous polymer dispersion (O) was prepared following the procedure of Example 1 except the poly(neopentyl adipate) was replaced with polytetramethylene ether glycol (2,000 molecular weight).

EXAMPLE 9

Aqueous polymer dispersion (K) was prepared following the procedure of Example 1 using the materials in Table 2.

TABLE 2

| | Parts by Wt |
|---|---|
| 1 Formrez 55-56 | 131 |
| 2 Methylene Dicyclohexyl Diisocyanate | 58 |
| 3 10% DABCO T-12 | 0.4 |
| 4 N-methylpyrrolidone | 25 |
| 5 Dimethylolpropionic Acid | 9.3 |
| 6 N-methylpyrrolidone | 40 |
| 7 Butyl Acrylate | 199 |
| 8 — | — |
| 9 Hexanediol Diacrylate | 1.8 |
| 10 Triethylamine | 7.8 |
| 11 D.I. Water | 494 |
| 12 Ethylenediamine | 0.8 |
| 13 N-methylpyrrolidone | 11 |
| 14 VAZO 64 | 1.1 |
| 15 D.I. Water | 20 |

EXAMPLE 10

An aqueous polymer dispersion is prepared following the procedure for Example 1 except isophorone diisocyanate (IPDI) is used in place of methylene dicyclohexyl diisocyanate as shown in Table 3.

TABLE 3

| | Parts by Wt |
|---|---|
| 1 Formrez 55-56 | 97 |
| 2 IPDI | 75 |
| 3 10% DABCO T-12 | 0.2 |
| 4 N-methylpyrrolidone | 25 |
| 5 Dimethylolpropionic Acid | 14 |
| 6 N-methylpyrrolidone | 28 |
| 7 Butyl Acrylate | 70 |
| 8 Styrene | 130 |
| 9 Hexanediol Diacrylate | 0.9 |
| 10 Triethylamine | 11 |
| 11 D.I. Water | 508 |
| 12 Ethylenediamine | 10 |
| 13 N-methylpyrrolidone | 8.5 |
| 14 VAZO 64 | 0.9 |
| 15 D.I. Water | 20 |

EXAMPLE 11

An aqueous dispersion is prepared following procedure of Example 1 except tetramethylxylene diisocyanate (TMXDI) is used in place of methylene dicyclohexyl diisocyanate as shown in Table 4.

TABLE 4

| | Parts by Wt |
|---|---|
| 1 Formrez 55-56 | 97 |
| 2 TMXDI | 81 |
| 3 10% DABCO T-12 | 0.2 |
| 4 N-methylpyrrolidone | 25 |
| 5 Dimethylolpropionic Acid | 14 |
| 6 N-methylpyrrolidone | 28 |
| 7 Butyl Acrylate | 70 |
| 8 Styrene | 129 |
| 9 Hexanediol Diacrylate | 0.9 |
| 10 Triethylamine | 11 |
| 11 D.I. Water | 505 |
| 12 Ethylenediamine | 10 |
| 13 N-methylpyrrolidone | 8.4 |
| 14 VAZO 64 | 0.9 |
| 15 D.I. Water | 20 |

EXAMPLE 12

The aqueous polymer dispersions A-P were evaluated as a coating composition on cold rolled steel panels. Table 5 presents the data for the evaluation of the various coatings.

PANEL PREPARATION AND COATING

Wipe the stamped surface of a 6" specimen of Bonderite 1000 cold rolled steel with methyl ethyl ketone and allow to dry.

Position a #40 wire wound coating rod at the very top of the steel panel. Pour the polymer dispersion just in front of the rod and for the entire width of the panel. Draw the rod down over the dispersion with enough pressure to maintain contact with the substrate for the complete stroke.

The applied film may be air dried for 24 hours or baked at 200° F. for 30 min. depending on the anticipated application.

A 2" wide strip cut from the bottom portion of the panel is used for the boiling water blush and adhesion tests. The remaining panel is used for the other tests.

PANEL TEST PROCEDURES

Boiling Water Blush: A 2" wide specimen from the bottom of the panel is placed in boiling deionized water for 20 minutes. Observe for degree of blush, i.e., 0–10, 0 being the worst and 10 being the best.

Boiling Water Adhesion: Using a cross hatch adhesion tool scratch the warm deposit on the 2" speciment from the Blush Test at 90° angles and down to the substrate. Apply tape to the cross hatch pattern and pull with a sudden motion. Record the percent film retained on the substrate, i.e., everything (100%) retained=10; everything removed=0; 90% retained=9, etc.

MEK Rubs: Wet a cotton swab with methyl ethyl ketone and rub the film applying considerable pressure; almost enough pressure to break the swab. A rub is equal to a forward and backward stroke. The cotton swab should always be saturated with methyl ethyl ketone. Record the number of rubs necessary to break through the film, not to exceed 400.

Ajax Rubs: Prepare a slurry of Ajax cleanser and deionized water. Wrap a piece of cloth tightly around an index finger and immerse into the Ajax slurry. Rub the film vigorously and with enough pressure to intentionally break through the film, maintaining sufficient Ajax cleanser on the cloth. Record the number of rubs necessary to break through the film, not to exceed 200. A rub is equal to a forward and backward stroke.

Pencil Hardness: Use a set of pencils with various graphite hardnesses that have been quantified and labeled. The graphite should be flat and the pencil held at ~45° forcing the edge of the graphite into the film. Record the hardest graphite used to scratch through the film.

Spot Test—10% HCl and 10% NaOH 30 min: Apply several drops of the above reagents on different regions of the film and let stand for 30 minutes. Absorb the residual reagents and record the effects. 0=worst, 10=best.

TABLE 5

| Polymer Dispersion | Pencil Hardness | MEK Rubs | 20 MINUTE SPOT TEST NaOH | 20 MINUTE SPOT TEST HCl | 30 MINUTE BOILING WATER Adhe | 30 MINUTE BOILING WATER Blush | Ajax |
|---|---|---|---|---|---|---|---|
| A | H | 95 | 7 | 9 | 0 | 0 | 10 |
| B | 2H | 130 | 7 | 9 | 10 | 7 | 10 |
| C | 4H— | 135 | 9 | 10 | 10 | 7 | 10 |
| D | 4H— | 145 | 9 | 10 | 10 | 8 | 10 |
| E | 4H— | 120 | 9 | 10 | 10 | 7 | 10 |
| F | 2H | 130 | 7 | 9 | 10 | 7 | 10 |
| G | 3H | 140 | 7 | 10 | 10 | 7 | 10 |
| H | 4H | 115 | 7 | 10 | 10 | 5 | 10 |
| I | 4H | 130 | 9 | 10 | 10 | 7 | 10 |
| J | 5H | 180 | 7 | 10 | 10 | 7 | 10 |
| K | H— | 9 | 2 | 7 | 7 | 0 | 2 |
| L | 2H | 130 | 7 | 9 | 10 | 7 | 10 |
| M | 2H | 29 | 7 | 10 | 10 | 5 | 2 |
| N | 4H— | 100 | 7 | 10 | 10 | 7 | 10 |
| O | 3H | 75 | 10 | 10 | 10 | 5 | 5 |
| P | 2H— | 13 | 2 | 9 | 7 | 0 | — |

Dispersions B=F=L, i.e., the same dispersion.

Comparison
A  Water soluble initiator
B  Oil soluble initiator
C  Batch addition of all the monomer
D  Batch addition of ½ of the monomers, delay addition of ½
E  Batch addition of ½ of the monomers, swell of ½
F  Vinyl = Butyl Acrylate; Tg = −54° C.
G  Vinyl = Butyl Acrylate/Styrene; Tg = 26° C.
H  Vinyl = Butyl Methacrylate; Tg = 20° C.
I  Vinyl = Styrene; Tg = 100° C.
J  Vinyl = Methyl Methacrylate; Tg = 105° C.
K  NCO/OH = 3.35:1; Vinyl = Butyl Acrylate
L  NCO/OH = 6.7:1; Vinyl = Butyl Acrylate
M  No polyethylenically unsaturated monomer
N  60% Vinyl/40% Urethane
O  Polytetramethylene ether glycol
P  Ethyl Acrylate and water soluble initiator
Rating Scale = 1 (worst) to 10 (best)

From the data in Table 5 it can be seen that polymers which contain a large amount of urea functionality render it relatively inert to organic solvents, compare polymer dispersion M versus polymer dispersion K.

The use of an oil soluble initiator renders the polymer relatively water insensitive. Compare polymer dispersions B-J in Table 5 made with an oil soluble catalyst with polymer dispersion A and polymer dispersion P made with water soluble initiator. Water insensitivity is also helped since no surfactants are used in the polymer synthesis.

The use of vinyl monomers reduces the cost compared to an all polyurethane system and the hardness of the polymer films can be controlled by choice of vinyl monomers, compare polymer dispersions F, G, H, I and J in Table 5. Also the inherent low viscosity of the dispersion allows for application on conventional gravure and flexographic presses.

The combination of inter chain mixing and crosslinking of the vinyl phase allows retention of urethane properties. Compare polymer dispersion M made without acrylic multifunctional crosslinker with polymer dispersion L made with it. The combination of good inter chain mixing, oil soluble initiator, crosslinking of the vinyl polymer, and proper choice of urethane composition make it possible to prepare polymers with good properties even when the urethane is the minor component. Note the good properties of polymer dispersion N made at a 40% urethane 60% vinyl level.

EXAMPLE 13

Aqueous dispersions of polyurethane-vinyl polymers in which the vinyl component comprises styrene and acrylic monomers are especially suited for coatings for paper label stock. In this example polyurethane-vinyl polymer dispersion G was evaluated as a paper label coating.

A #20 wire wound rod was used to coat a commercial label with the dispersion. The coated label was dried in a 200° F. oven for 5 minutes.

TABLE 6

| | 60 Deg. Gloss | Solvent Resistance No. of Double Rubs | | | 60 Min. NaOH Soak |
|---|---|---|---|---|---|
| | | MEK | Et.AC | MeOH | |
| Dispersion G | 55 | 12 | 13 | 10 | No Effect |
| Styrene-Acrylic Joncryl 585 (S.C. Johnson Inc.) | 60 | 9 | 10 | 9 | 10 min attack |
| Commercial Water based Polyurethane (I.C.I. Polyvinyl Chemicals) | 55 | 13 | 13 | 10 | No Effect |
| Uncoated Label | 25 | 4 | 4 | 4 | 15 min attack |

STATEMENT OF INDUSTRIAL APPLICATION

The present invention provides a method for preparing aqueous polyurethane/vinyl polymer dispersion which are especially suited for making coated paper substrates having a good balance of protection from solvents, corrodants, abrasion and good and flexibility.

We claim:

1. In a method for making an aqueous polyurethane-vinyl polymer dispersion, the improvement which comprises
   (a) forming a carboxy-containing, water-dispersible, isocyanate terminated polyurethane prepolymer,
   (b) adding a vinyl monomer composition, which includes a polyethylenically unsaturated monomer, to the prepolymer to form a prepolymer/monomer mixture,
   (c) adding a tertiary amine to the prepolymer/monomer mixture in an amount sufficient to render the prepolymer water dispersible,
   (d) dispersing the prepolymer/monomer mixture in water,
   (e) adding an oil soluble free radical initiator and a chain-extender to the aqueous dispersion, and
   (f) polymerizing the vinyl monomer and completing chain extension of the prepolymer by heating the aqueous dispersion.

2. The method of claim 1 in which step (a) comprises forming an isocyanate-terminated polyurethane prepolymer and reacting it with an acid-containing diol.

3. The method of claim 1 in which the tertiary amine is triethylamine.

4. The method of claim 1 in which a polar organic liquid is added to the prepolymer/monomer mixture prior to its dispersal in water to enhance the compatability of the organic and aqueous phases.

5. The method of claim 2 in which the acid-containing diol is a dihydroxyalkanoic acid.

6. In a method for making an aqueous polyurethane-vinyl polymer dispersion, the improvement which comprises
   (a) forming a carboxy-containing, water-dispersible, aliphatic or cycloaliphatic isocyanate terminated polyurethane prepolymer,
   (b) adding a vinyl monomer composition, which includes at least one monomer which is a $C_1$–$C_6$ alkyl (meth)acrylate, styrene or mixtures thereof and a polyethylenically unsaturated monomer which is a diacrylate of a $C_2$–$C_6$ diol, to the prepolymer to form a prepolymer/monomer mixture,
   (c) adding a tertiary amine to the prepolymer/monomer mixture on a 65–100% amine equivalent per carboxy equivalent basis,
   (d) dispersing the prepolymer/monomer mixture in water,
   (e) adding an azo-type oil soluble free radical initiator and a diamine chain-extender to the aqueous dispersion, and
   (f) polymerizing the vinyl monomer and completing chain extension of the prepolymer by heating the aqueous dispersion to 65°–90° C.

7. The method of claim 6 in which step (a) comprises forming an isocyanate-terminated polyurethane prepolymer and reacting it with a dihydroxyalkanoic acid.

8. The method of claim 7 in which a polar organic liquid is added to the prepolymer/monomer mixture prior to its dispersal in water to enhance the compatability of the organic and aqueous phases.

9. The method of claim 8 in which the tertiary amine is triethylamine.

10. The method of claim 9 in which the acid-containing diol is a 2,2-dimethylolpropionic acid.

11. In a method for making an aqueous polyurethane-vinyl polymer dispersion, the improvement which comprises
    (a) forming a water-dispersible, aliphatic or cycloaliphatic isocyanate terminated polyurethane prepolymer made water-dispersible by reacting with 2,2-dimethylolpropionic acid,
    (b) adding a vinyl monomer composition, which includes at least one monomer which is a $C_1$–$C_6$ alkyl (meth)acrylate, styrene or mixtures thereof and a polyethylenically unsaturated monomer which is a diacrylate of a $C_2$–$C_6$ diol, to the prepolymer to form a prepolymer/monomer mixture,
    (c) adding triethylamine to the prepolymer/monomer mixture on a 65–100% amine equivalent per carboxy equivalent basis,
    (d) adding a polar organic liquid to the prepolymer/monomer mixture and dispersing the mixture in water,
    (e) adding an azo-type oil soluble free radical initiator and ethylenediamine chain-extender to the aqueous dispersion, and
    (f) polymerizing the vinyl monomer and completing chain extension of the prepolymer by heating the aqueous dispersion to 65°–90° C.

12. The method of claim 11 in which the polar organic liquid is N-methylpyrrolidone.

13. The aqueous polyurethane-vinyl polymer dispersion made by the method of claim 1.

14. The aqueous polyurethane-vinyl polymer dispersion made by the method of claim 2.

15. The aqueous polyurethane-vinyl polymer dispersion made by the method of claim 3.

16. The aqueous polyurethane-vinyl polymer dispersion made by the method of claim 4.

17. The aqueous polyurethane-vinyl polymer dispersion made by the method of claim 5.

18. The aqueous polyurethane-vinyl polymer dispersion made by the method of claim 6.

19. The aqueous polyurethane-vinyl polymer dispersion made by the method of claim 7.

20. The aqueous polyurethane-vinyl polymer dispersion made by the method of claim 8.

21. The aqueous polyurethane-vinyl polymer dispersion made by the method of claim 9.

22. The aqueous polyurethane-vinyl polymer dispersion made by the method of claim 10.

23. The aqueous polyurethane-vinyl polymer dispersion made by the method of claim 11.

24. The aqueous polyurethane-vinyl polymer dispersion made by the method of claim 12.

* * * * *